(12) United States Patent
Gaur

(10) Patent No.: US 12,527,479 B2
(45) Date of Patent: Jan. 20, 2026

(54) METHODS AND SYSTEMS FOR DETECTING DEEP TISSUE INJURIES

(71) Applicant: Girija Gaur, Arcadia, CA (US)

(72) Inventor: Girija Gaur, Arcadia, CA (US)

( * ) Notice: Subject to any disclaimer, the term of this patent is extended or adjusted under 35 U.S.C. 154(b) by 81 days.

(21) Appl. No.: 18/103,442

(22) Filed: Jan. 30, 2023

(65) Prior Publication Data

US 2024/0252045 A1    Aug. 1, 2024

(51) Int. Cl.
*A61B 5/00*    (2006.01)
*A61B 5/02*    (2006.01)

(52) U.S. Cl.
CPC ........ *A61B 5/02042* (2013.01); *A61B 5/0062* (2013.01); *A61B 5/02007* (2013.01); *A61B 5/742* (2013.01)

(58) Field of Classification Search
CPC ................................................. A61B 5/02042
See application file for complete search history.

(56) References Cited

U.S. PATENT DOCUMENTS

| | | | | |
|---|---|---|---|---|
| 10,772,541 B2 * | 9/2020 | Klein | ................... | A61B 5/6816 |
| 2015/0011892 A1 * | 1/2015 | Sostek | ................. | A61B 5/0077 |
| | | | | 600/473 |
| 2022/0287584 A1 * | 9/2022 | Burns | ................. | A61B 5/4875 |

* cited by examiner

*Primary Examiner* — Joseph M Santos Rodriguez

(57) ABSTRACT

Methods and systems for detecting and projecting regions of tissue injury are described. The system may acquire reflectance data via optical scanning methods or imaging using visible, near-infrared, and/or infrared wavelengths. The system may analyze the acquired reflectance data to generate three-dimensional tissue injury maps, and project the generated injury maps onto the areas being imaged. The system may implement machine learning methods to subtract out false positive contributions from deoxygenated blood flow in underlying veins to generate the three-dimensional injury maps.

20 Claims, 5 Drawing Sheets

METHODS AND SYSTEMS FOR DETECTING DEEP TISSUE INJURIES

CROSS REFERENCE TO RELATED APPLICATIONS

This patent application claims the benefit of U.S. Provisional Application No. 63/304,649 filed Jan. 30, 2022.

BACKGROUND

The collection and analysis of evidence indicative of domestic violence, child abuse, elder abuse, and so forth, is important to identify and protect those who are most vulnerable or at risk. Such violence or abuse often results in physical injuries. Conventional approaches, however, only provide rough evaluation of such injuries. For instance, medical personnel or investigators typically inspect, or photograph, cuts, skin indentations, redness, bruising, which are directly visible with the naked eye. Yet, many broken capillaries and/or soft tissue injuries do not present as bruises or discolorations that are clearly visible on the skin. This can be due to injury depth from the skin surface, slow pace of bruise formation, overgrowth of hair, tattoos, as well as skin conditions or color. For instance, darker skin tones can reduce the visibility of bruising or skin color changes. Hence, there is a need for improved methods and systems for detecting injuries.

SUMMARY

The present disclosure overcomes the shortcomings of previous technologies by providing methods and systems for detecting deep tissue injuries.

In light of the foregoing background, the summary provided herein merely presents various described aspects in a simplified form as a prelude to the more detailed description provided below. In accordance with some aspects of the present disclosure, a method for detecting deep tissue injuries is provided. The method includes generating, by an application-specific device, light comprising a first set of wavelengths; imaging, by the application-specific device and using the first set of wavelengths, a user selected imaging area of a subject; receiving, by the application-specific device, optical data associated with the imaging area and the first set of wavelengths; determining, by the application-specific device and based on the optical data, at least one three-dimensional area of subcutaneous blood coagulation in the imaging area; accessing, by the application-specific device and based on the imaging area, one or more regions of baseline data, wherein the one or more regions of baseline data is associated with undamaged circulatory networks; generating, by the application-specific device, a three-dimensional injury map based on subtracting the one or more regions of baseline data from the at least one three-dimensional area of subcutaneous blood coagulation; and projecting, by the application-specific device and based on the three-dimensional injury map, an image outlining an extent of tissue injury onto the subject.

In accordance with another aspect of the present disclosure, a system for detecting deep tissue injuries is provided. The system includes at least one light emitting component configured to illuminate, using a first set of wavelengths, a user selected imaging area on a subject; one or more photodetectors configured to receive optical data associated with the imaging area on the subject and the first set of wavelengths; an analysis system configured to: receive, from the one or more photodetectors, the optical data; analyze the received optical data to determine at least one three-dimensional area of subcutaneous blood coagulation; access, based on the imaging area, one or more regions of baseline data, wherein the one or more regions of baseline data is associated with undamaged circulatory networks; and generate a three-dimensional deep injury map based on subtracting the one or more regions of baseline data from the at least one three-dimensional area of subcutaneous blood coagulation; and a projection system configured to: receive, from the analysis system, the three-dimensional injury map; and project, using visible optical light, an image outlining an extent of tissue injury on the subject, wherein the image outline is based on the three-dimensional deep injury map.

The summary here is not an exhaustive listing of the novel features described herein and is not limiting of the claims. These and other features are described in greater detail below.

BRIEF DESCRIPTION OF THE DRAWINGS

Embodiments are herein described, by way of example only, with reference to the accompanying drawings, wherein.

DETAILED DESCRIPTION

Figure 1:
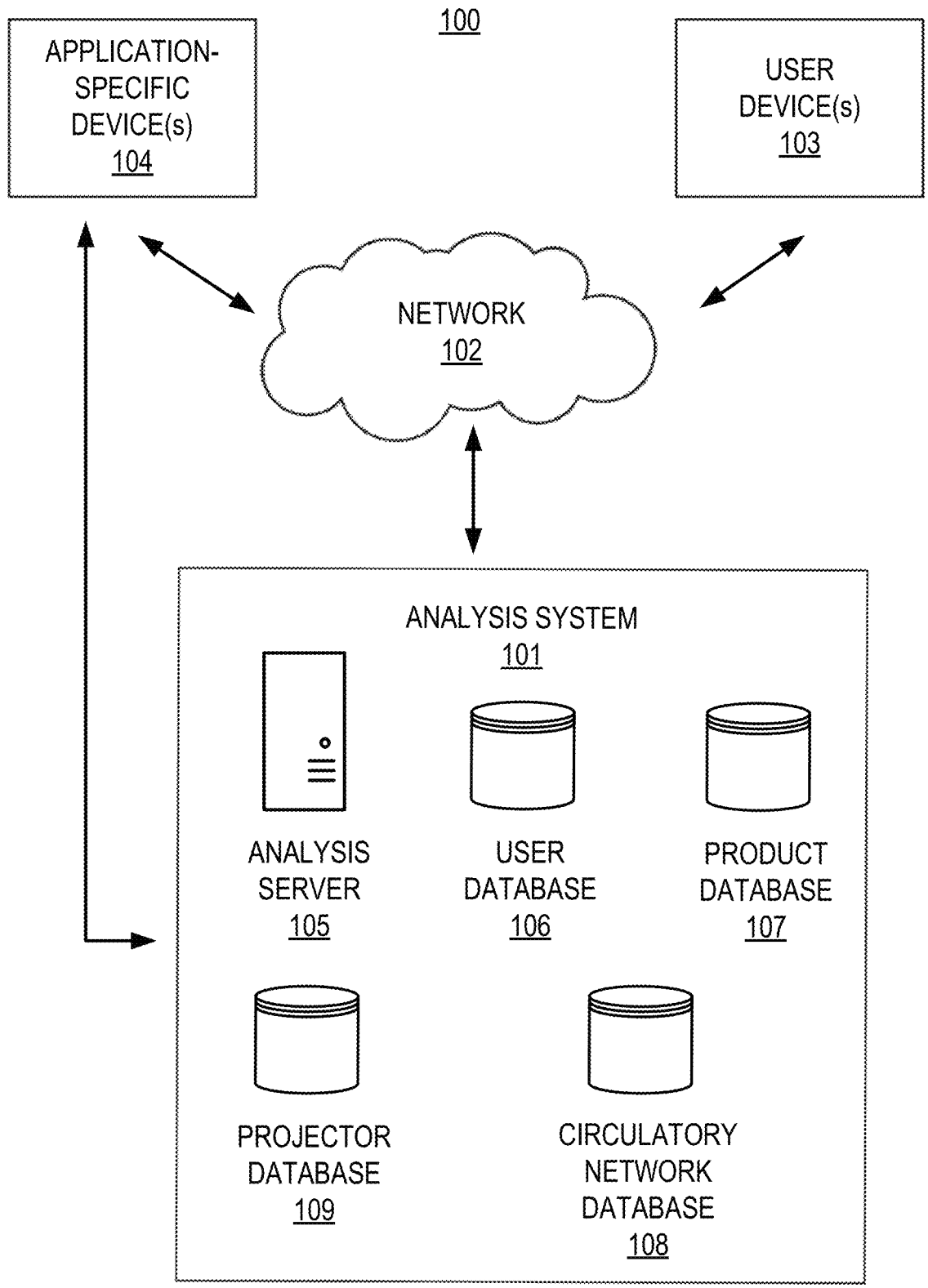
FIG. 1 is an illustration of an example system, in accordance with aspects of the present disclosure.

Evidence of physical injury is critical for building victim credibility and accessing justice by recording, analyzing, and managing identifiers and/or causation records (e.g., weapons, blunt force, accessories) of physical abuse. The current approach simply relies on viewing visible signs of physical injury by using cameras or the naked eye, both of which are inherently limited in only providing information seen at the surface level of human skin with subjective and varying interpretations of causation, if at all, with most deep-tissue injuries escaping notice. For example, many broken capillaries and/or soft tissue injuries fail to translate into visible signs of surface-level related injuries. As such, a need exists to detect blood vessel breakages, subcutaneous blood coagulation, muscle injuries, and ligament damage associated with soft tissue injuries extending below the surface of the skin.

The present disclosure recognizes that cost reductions and reduced form factors in light emitting diode (LED) and laser technology have opened up new avenues of applications spanning portable, hand-held devices used in medical imaging, robotics, security systems, and others. However, a need exists for the development of newer technologies for rapidly and safely detecting soft-tissue, subcutaneous injuries. There is also a need to detect such injuries while considering or negating the influence of confounding factors, such as stages of injury formation and healing (e.g., 24 to 48 hours needed for visible bruise formation), obesity, depth of injury, hair, darker skin tones, tattoos, and other skin conditions.

Visual inspection of physical injuries with the naked eye and/or traditional cameras that rely on the interaction of the visible part of the electromagnetic spectrum with the skin and coagulated blood from physical injuries. Such inspection, however, is inherently limited in detecting subcutaneous tissue injuries because those visible-spectrum wavelengths are greatly affected by absorption by melanin present in skin and they do not penetrate beyond hundreds of micrometers from the skin. In fact, no methods exist to probe for certain injuries in a non-invasive, rapid, safe, and accurate way while considering or negating the influence of melanin (e.g. skin tones), while also detecting injuries that may be hard to see on the skin surface of people who are obese, and/or have a thicker layer of skin and/or fat.

A need exists to equalize visual perceptions of cutaneous and subcutaneous tissue injuries irrespective of race, weight, hair, and/or other skin art such as tattoos that might make it impossible to detect bruises and blood coagulations at cutaneous and/or subcutaneous levels. It is recognized herein that near infrared and infrared LEDs, lasers, and other light emitting devices spanning wavelengths beyond 700 nm and up to 1600 nm, can operate at eye-safe levels and provide an avenue for injury detection. In some embodiments, infrared wavelengths exceeding 1600 nm may also be utilized in order to increase the accuracy of detecting and projecting areas of soft tissue injuries and/or subcutaneous blood pooling.

When combined with scanning systems, software and/or data processing systems, and machine learning approaches, it is also recognized herein that the accuracy of detecting cutaneous and subcutaneous tissue injuries can further be increased. For instance, models or algorithms based on machine learning (ML), artificial intelligence (AI), and/or neural network programming can be trained using various injury datasets to determine and display identifiers of injury causation(s) and/or injury profile(s). Such techniques, supported by increasingly powerful hardware processing power, can aid in increasing the accuracy and reducing the time with which subcutaneous injuries are detected and analyzed. In addition, such techniques can leverage the infrastructure of powerful processing power of portable devices, such as smartphones, wearable devices, and other devices, to further refine and/or enhance the detection results. For instance, additional injury information, such as injury intensity, injury depth (e.g., a hundred microns, extending beyond 1 mm, extending beyond 1 mm, etc.), estimated healing time, and so forth, can be obtained using AI and ML techniques.

Methods and systems described herein can find a wide variation of application, including for example, use in medical settings to better assess a patient's condition. For instance, by enabling the detection of tissue injuries irrespective of the confounding factors (e.g. skin type or condition, health condition, etc), victims of physical assaults, athletes, disabled persons, babies, animals, and others who cannot describe their injuries or pain, as well as obese persons, and/or others, can have their injuries safely and accurately detected and appropriately treated. Also, advocates of child abuse, elder abuse, and/or disabled person abuse can document abuse more effectively and accurately, and athletes can tailor their physical activity levels more effectively. Deeper tissue inflammation associated with soft tissue injuries may also be detected contemporaneously and related information may be transmitted to the user device and/or projected onto the imaged skin surface for the convenience of the user, victim, forensic nurse, law enforcement personnel, doctors, and/or other responding personnel.

Methods and systems described herein may be used or support legal situations. For instance, injuries detected in accordance with aspects of the present disclosure can be used in law enforcement situations to enhance the credibility of victims of assault or other occurrences who otherwise may not have sufficient evidence to prove cause of injury without clearly visible bruising (e.g., from blunt force trauma, strangulation, accidents, etc.). Similarly, evidence of injuries can support a victim's credibility, declaration, or deposition in legal proceedings. For example, direct evidence of physical abuse may be identified, determined, and/or analyzed by determining soft-tissue injuries, bruises, strangulation mark(s), and petechiae in eyes. Indirect evidence of physical abuse may be identified, determined, and/or analyzed based on other signs of physical trauma such as brain damage, heart ailments, post-traumatic stress disorder, miscarriages, and other ailments that may stem from suffering strangulation and/or other physical abuse.

Artificial intelligence (AI) backed deep learning algorithms can be trained on the injury datasets to be able to determine and display identifiers of injury causation(s) and/or injury profile(s). The methods and systems described lift some of the burdens felt by victims of abuse in the identification, documentation, management, authentication, and control over the evidence of physical abuse suffered, and empower the victims with scientifically backed evidence of physical injuries suffered.

In some embodiments, methods and systems described herein enable projection of an image outlining an extent of tissue injury onto the corresponding anatomical region of a subject being imaged. The methods and systems may project a two-dimensional image of at least one region associated with subcutaneous blood coagulation based on a shorter wavelength (e.g., visible wavelength(s)) than a first set of wavelengths used for scanning the imaging area of the subject, wherein the first set of wavelengths used for scanning the imaging area are associated with near-infrared wavelengths (e.g., 750 nm to 1080 nm, 750 nm to 1700 nm).

The methods and systems may generate the first set of wavelengths by controlling at least two light emitting devices that respectively generate light corresponding to two different center frequencies of emission between 750 nm and 1080 nm, and/or between 1080 nm and 1700 nm. In some embodiments, the methods and system may generate a second set of wavelengths extending beyond 1080 nm and up to 1700 nm for imaging deeper tissue injuries for sensitively and/or accurately.

The methods and systems may receive user information associated with cause of injury; determine an estimated date of injury based on the at least one region associated with subcutaneous blood coagulation and the information associated with cause of injury; and cause display of the estimated date of injury. The methods and systems may cause display of the three-dimensional injury map on a screen.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. In describing various aspects, the same component on different drawings may be designated by the same reference numeral, and repetitive description of the same component will be omitted.

Turning now to FIG. 1, an example illustration of a system 100, in accordance with aspects of the present disclosure is shown. In some applications, the system 100 may be used for detecting, analyzing, and projecting or indicating an area of cutaneous and/or subcutaneous tissue injury. As illustrated in FIG. 1, in some embodiments, the system 100 may include an analysis system 101, a network 102, one or more user device(s) 103, and one or more application-specific device(s) 104.

The analysis system 101 may be configured to receive, process, and/or analyze data acquired by various components of the system 100. In some embodiments, the analysis system 101 may include various computers, processors, or processing units, such as an analysis server 105, as shown in FIG. 1. The analysis system 101 may also include various databases, such as a user database 106, a product database 107, a circulatory database 108, and a projector database 109. The various computers, processors and/or servers may be configured to perform various functions including receiving, sending, locating, and/or retrieving user data, controlling one or more scanners for analyzing the area under detection, image processing, data mining, implementing machine learning and/or artificial intelligence algorithms, and/or controlling a projector(s) for projecting the image of tissue injury over a background light (e.g., green or some other suitable visible wavelength light that can make it easier to observe the projected area of tissue injury).

The network 102 may be any type of information distribution network, such as satellite, telephone, cellular, wireless, optical fiber, coaxial cable, and/or a hybrid fiber/coax (HFC) distribution network. Additionally, or alternatively, the network 102 may be a combination of networks. The network 102 may use a series of, or various, interconnected communication links (e.g., coaxial cables, optical fibers, wireless, etc.) and/or some other network to connect the analysis system 101 with the user device(s) 103, application-specific device(s) 104, and/or one or more third-party device. In some embodiments, the third-party device(s) may be associated with a cloud storage or cloud computation platform. The application-specific device(s) 104 may be referred to as an apparatus in some embodiments.

In some embodiments, one or more of the user device(s) 103 may include, or be, a smartphone, tablet, drone, robotic assistant, and so forth. In some embodiments, one or more of the application-specific device(s) 104 may include, or be, a standalone device or component, or reconfigured smartphone, that is capable of imaging, emitting and/or capturing optical signals having infrared wavelengths and/or near-infrared wavelengths (750 nm to 17000 nm). The application-specific device(s) 104 may connect to various hardware that can aid in imaging, emitting and/or capturing of signals. Examples of such hardware includes scanners, collimators, lenses, filters, optical switches, fibers, projectors, a baseline wavelength emitter (e.g., an emitting device for 650 nm or some other wavelength), circuitry (electronic and/or photonic) for subtracting out the effects of one or more confounding factors. In some embodiments, the application-specific device(s) 104 may acquire reflectance data associated with wavelengths varying between 410 nm and 1100 nm. The reflectance data may be collected at varying spectral resolutions (e.g., 2 nm up to 50 nm in various increments).

In some embodiments, the application-specific device(s) 104 may include at least one light emitting device or light emitting component, such as an infrared and/or near-infrared LED. In other embodiments, the light emitting device may be separate or located independently from the application-specific device(s) 104. The light emitting component or emitting device may be configured to illuminate an imaging area of interest or area under detection. The application-specific device(s) 104 may include one or more photodetectors capable of detecting the electromagnetic signals or waves that may have been reflected, transmitted, and/or back-scattered from or through an imaging area of interest or area under detection.

In some embodiments, the application-specific device(s) 104 may include a scanning system for directing the light from the emitter(s) to the imaging area under detection. The scanning system may receive the reflected, transmitted, and/or back-scattered light from the imaging area of interest or area under detection. In some other embodiments, the application-specific device(s) 104 may include an imager for imaging the area of interest or the area under detection. The scanning system may be a microelectromechanical (MEMs) scanner, a polygon scanner, or another type of scanner mechanism used in optical imaging and/or scanning applications. In some embodiments, the imaging device may include a charge coupled device (CCD) (e.g., FD 1665 multispectral camera system 400 nm to 1100 nm).

The application-specific device(s) 104 may include a computing device or hardware for acquiring, analyzing, and/or outputting data, such as an application-specific integrated circuit, a processor, a graphical processor unit, an integrated photonic circuit, a computer, a laptop, a smartphone, a tablet, a cloud server, and/or an internet-of-things (IOT) device.

Although FIG. 1 shows the analysis system 101 as being separate from the application-specific device(s) 104, in some embodiments, the analysis system 101 may be part of, or integrated into, the application-specific device(s) 104.

The system 101 may include various databases, such a user database 106 for storing various user information, a product database 107 for storing product and/or proprietary information (e.g. hardware configurations, settings, etc) associated with the application-specific device(s) 104, a circulatory network database 108 for storing circulatory network data accumulated from various sources (such as the application-specific device(s) 104, medical imaging records, user image records, victim image records, public databases with information on vascular images and/or information), and a projector database 109 for storing data and information associated with a projector system or element used for generating and projecting images or renderings of bruises with or without the use of a background light, for various skin conditions, and/or power level settings. The projection system or element may be configured to project an image outlining an extent of tissue injury onto the subject whose injuries are being imaged and/or analyzed. The image projection may be based on using visible wavelengths of light so that victims of physical abuse, subjects being imaged, responding personnel, and various other personnel involved in delivering aid and/or assistance to the subject may see the extent of tissue injury and/or gauge the severity of tissue injury (e.g, whether injury is present on extremities, face, neck, back, etc.).

Figure 2:
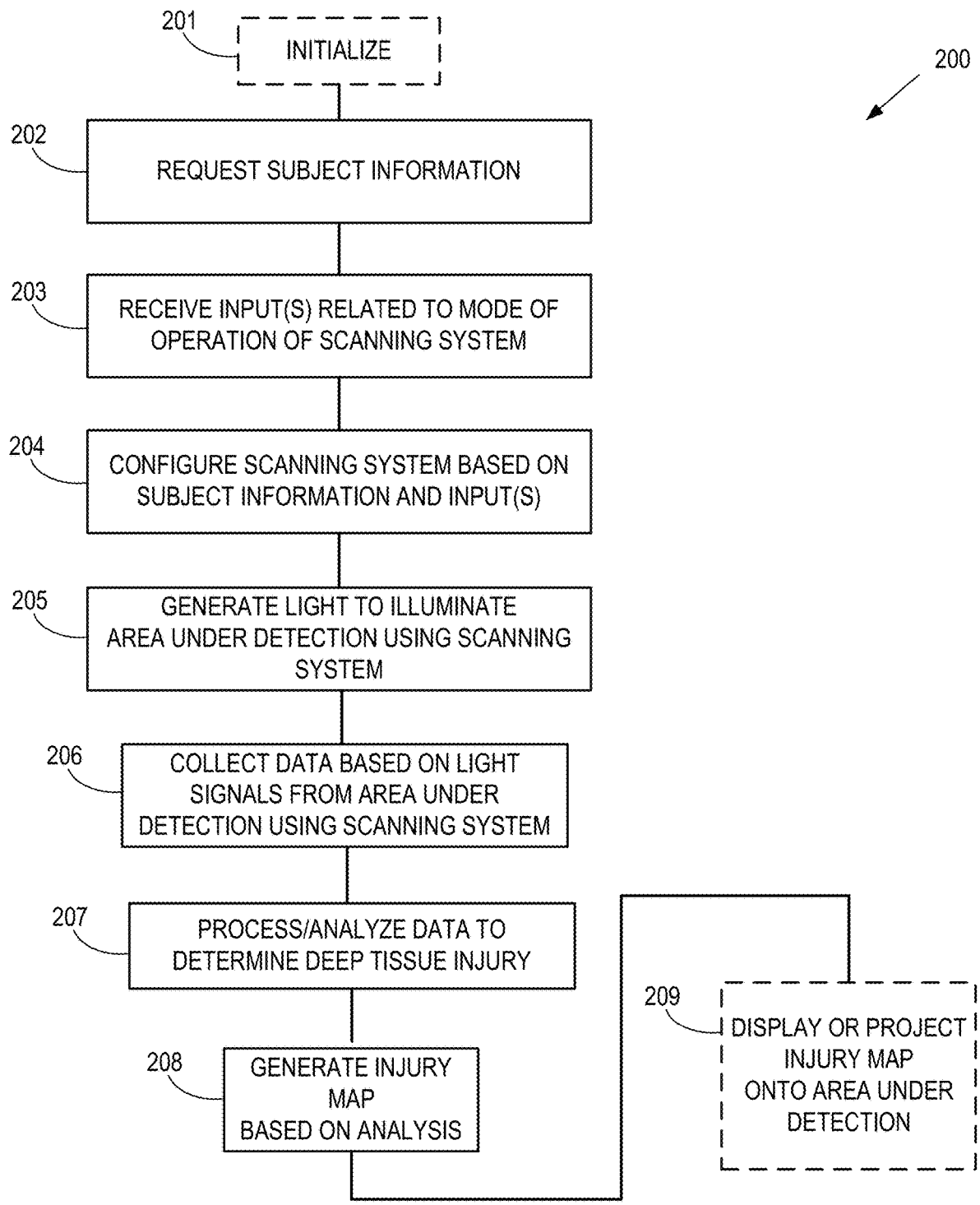
FIG. 2 shows a flowchart setting forth steps of a process, in accordance with aspects of the present disclosure.

FIG. 2 shows an example flowchart setting forth steps of a process 200, in accordance with aspects of the present disclosure. The process 200 may be carried out using various systems, devices, or hardware, such as system 100 described with reference to FIG. 1 in accordance with various aspects of the embodiments, in order to image and analyze injuries. Depending upon the results of the analysis, the system 100 may further provide estimated healing dates or times and/or provide information about agencies (e.g., domestic violence shelters, urgent care centers, child protective services, non-profit organizations, national coalitions for domestic abuse, elder abuse, or child abuse victims) or personnel (e.g., law enforcement, medical, legal) that victims suffering such injuries may contact.

The process 200 may optionally begin at step 201 with initialization. For example, the system 100 may automatically set up communication pathways with remote servers (e.g., the analysis server 105) and/or databases (e.g., user database 106, product database 107, circulatory information database 108, and projector database 109). The system may determine geographic location, time of day, and date information based on information transfer across the communication pathways. Various other types of information including facility the device 104 is located in may be determined. Depending on the information the system is initialized with, the system may automatically select power levels associated with one or more light emitting devices and set baseline thresholding levels for one or more imaging devices of the application-specific device 104.

At step 202, subject information may be requested and processed. For instance, in some implementations, the system 100 may request subject information associated with ethnicity, location, weight, age, skin art, tattoos, engagement in physical activities, date and/or time of injury, cause of injury, at 202. Such information may be used by the analysis system 101 for determining the presence of one or more confounding factors, such as melanin, obesity, tattoos, and/or cause of injury to determine a set or various of skin-related and/or subcutaneous metrics. Such metrics may comprise a first set of factors that influence the detection and/or analysis of subcutaneous tissue injury. Weighted influence associated with each factor of the first set of factors can then be determined by the system 100 based on data mining, machine learning, and/or AI algorithms.

Then, at step 203, various inputs related to a mode of operation of a scanning system may be received. In some implementations, the system 100 may request user input(s) related to power levels of the emitter device (e.g., Class 1 laser, Class 2 laser, 0.5 mW, 1 mW, 5 mW, etc.), the emitter wavelength (e.g., 650 nm, 760 nm, 800 nm, 1064 nm, etc.), and/or selection of an optical filter for narrowing the linewidth of the imaging device.

A configuration of hardware based on the subject information and input(s) may then be carried out at step 204. For instance, the system 100 may configure the mode of operation of the scanning system based on the user input(s) for imaging the area under detection. The system 101 may turn On the emitting device based on the user inputs, position the optical filter, and/or configure the scanning system to scan the area under detection.

At step 205, light may be generated to illuminate area under detection or imaging area of a subject. For instance, in some implementations, one or more emitting devices(s) of the system 100 may be activated to illuminate and scan the area under detection. Then, data based on light signals emitted from, or through, the area under detection may be collected, as indicated by step 206. In some embodiments, system 100 may work in a reflectance mode and detect light signals or wavelengths that reflect from the area under detection. Hence, the data collected may include reflectance data. In some embodiments, the system 100 may work in transmittance mode and detect light signals or wavelengths that pass through the area under detection. To this end, data collected at step 206 may include transmittance data.

In some embodiments, baseline imaging may be performed using multiple visible and/or near-infrared wavelengths for primarily imaging undamaged vascular networks. In other embodiments imaging may be performed using the same wavelengths on uninjured and injured areas of the user, with the uninjured imaging data used for eliminating the influence of user-specific variations in chromophore (e.g., melanin, hemoglobin, methemoglobin, lipid, water, collagen) interactions with the wavelengths to yield more accurate and unbiased three-dimensional injury maps.

At 207, data collected at step 206 may then be processed and/or analyzed to determine injury. In some implementations, processing and/or analysis of data at step 207 may be based on subject information, and/or input(s) received at steps 202 and 203, respectively. Furthermore, in some implementations, step 207 may occur contemporaneously to the imaging area of the subject (or user), or data collection at step 206, or may occur sequentially or with a slight delay depending upon the data transmission and processing speeds of the transmitting, receiving, and/or processing systems being utilized to process/analyze the data.

In some embodiments, analysis and/or processing carried out at step 207 may be supplemented with machine learning, AI, and/or neural network-based processing to subtract out the contributions from underlying veins. An application-specific integrated circuit (ASIC) and/or field-programming gate array (FPGA) may be used to help provide rapid processing and analysis capabilities. Techniques used to image veins can be employed to further refine the final three-dimensional and/or two-dimensional injury maps by subtracting out the regions where there are underlying veins but no blood coagulation related tissue injury. Imaging, identifying, and accounting for underlying veins provides a method for identifying areas of blood coagulation, while removing confounding imaging data associated with the underlying veins. Machine learning models can be used to recognize the regions where there are underlying veins and accurately remove those from the outputted data. This helps to remove false positives and improve the accuracy of the imaging technique by selectively identifying regions where blood has coagulated due to tissue injuries that resulted in the breakage of blood vessels.

Machine learning models may include models trained on datasets of images of normal or undamaged blood circulatory networks (e.g., location based distribution of veins and blood vessels, capillaries, arteries) classified based on age, racial ethnicity, weight, skin tone (such as for melanin content), obesity metrics, and other conditions that may interfere and/or interact with the scanning wavelengths of system 100. The machine learning models may then automate the identification and/or subtraction of undamaged circulatory blood vessels from the final projected and/or displayed image.

In some embodiments, the system 100 may employ a baseline scan using one or more imaging wavelengths (e.g., around 650 nm), different from the wavelengths used to interact with injured tissue and/or blood vessels. The baseline scan may provide baseline imaging data that is less sensitive to the presence of deoxygenated blood. This baseline imaging data can be used to subtract out the contributions from underlying blood vessels. The system may conduct a baseline imaging scan as a first scan followed by a second imaging scan with the chosen imaging wavelength(s) at near infrared or infrared wavelengths.

In some embodiments, the datasets of images of normal or undamaged blood circulatory networks may be used to improve the accuracy of the baseline scans to generate one or more regions of baseline data (also referred to as baseline imaging data in some embodiments) that are associated with undamaged circulatory networks. For example, information from the databases of circulatory networks can be used to verify the location, physiology, and type of vein captured by the imager. The imaging information associated with the vein can then be more accurately subtracted out from a final three-dimensional image of the tissue injury that ensures that contributions from deoxygenated blood flow in that vein is not falsely included in the injury map.

Absorption of wavelengths exceeding 700 nm by melanin rapidly drops off and thus, imaging with near-infrared and/or infrared devices can overcome the influence of melanin on recognizing areas of blood coagulation. This avoids influence of skin color on the output data. Additionally, the greater penetration depth of infrared and near-infrared wavelengths allow penetration down to several millimeters which is far greater than that achievable by mere visible light-based detection techniques. The penetration depth of such imaging devices can extend up to nearly a centimeter. This enables sub-cutaneous imaging despite differences in skin thickness occurring due to race, obesity, age, gender, medications, and/or other genetic influences.

In some implementations, at least one three-dimensional area of subcutaneous blood coagulation in the imaging area of the subject may be determined based on the processing/analysis carried out at step 207. In other implementations, one or more regions of undamaged circulatory networks in the imaging area may be additionally or alternatively determined at step 207. The imaging area of the subject may alternatively be referred to as area under test.

In some embodiments, the one or more of the databases 106-109 and/or analysis methods may be stored on the application-specific device locally and the analysis may be carried out locally ensuring user privacy. In some embodiments, a combination of local analysis and remote (e.g., cloud-based) analysis may be used depending upon user privacy settings and processing power of the application-specific device. According to some embodiments, the application-specific device(s) 104 may interface with computing devices to perform the analysis locally or communicate with the remote servers to perform some combination of local and remote analysis. The analysis system may be configured to communicate with a user account and/or application programmed on the user device to provide the user with the results in a convenient manner.

Based on the processing and/or analysis carried out at step 207, an injury map may be generated, as indicated by step 208. In some embodiments, system 100 may generate and/or access one or more regions of baseline data associated with undamaged circulatory networks. The three-dimensional injury maps may then be generated based on subtracting the one or more regions of baseline data from the at least one three-dimensional area of subcutaneous blood coagulation. Optionally, a rendering of the injury map may be displayed via a screen and/or projected on the area under detection that may be the corresponding anatomical portion of the subject, as indicated by step 209. For instance, the system 100 may generate and display, or project at least one two-dimensional (2D) image onto the area under detection. In some examples, the displayed or projected 2D image(s) may indicate areas of tissue injury that have coagulated blood and/or the underlying veins that may be confound imaging results due to the presence of deoxygenated blood (that may absorb similar wavelengths).

Figure 3:
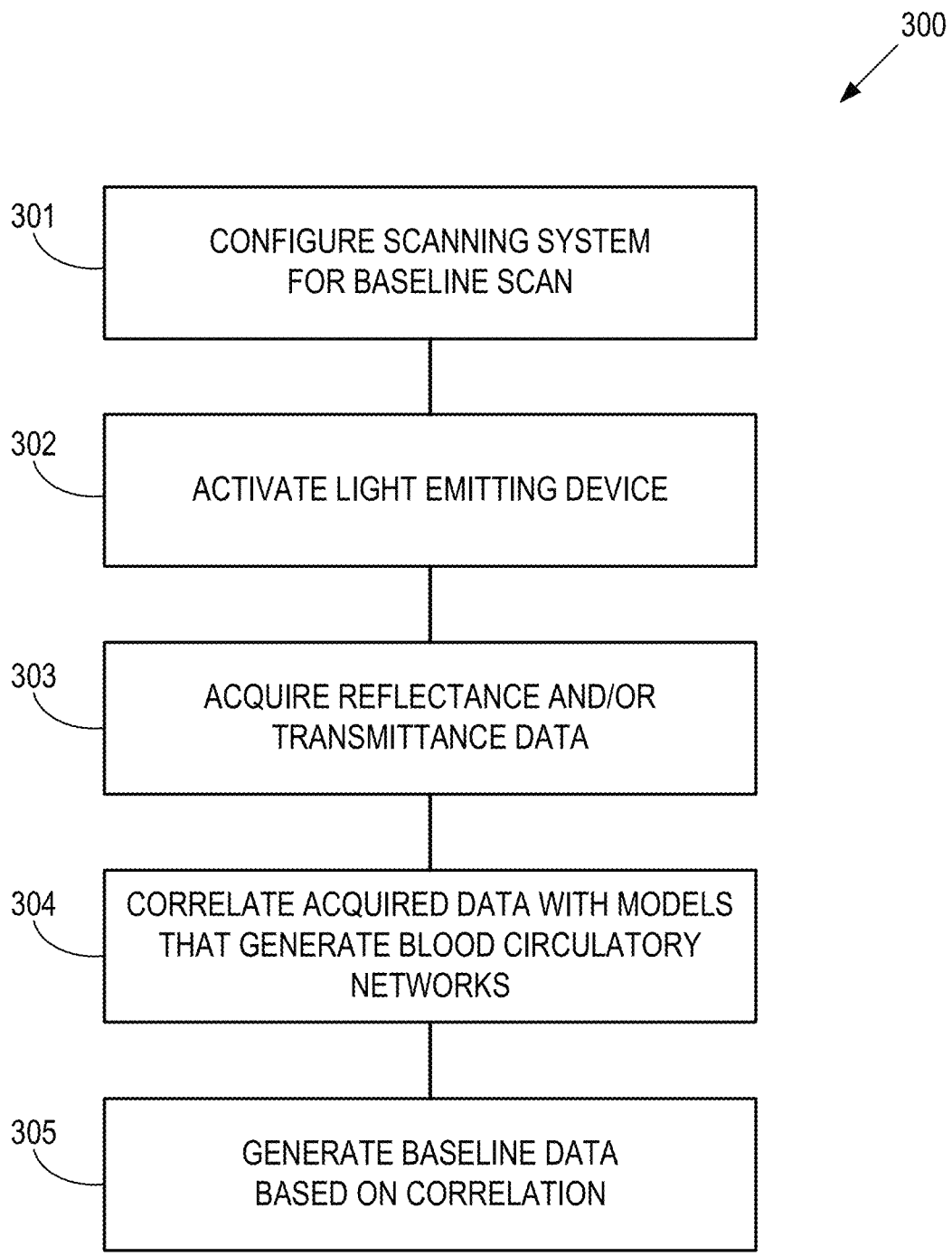
FIG. 3 shows another flowchart setting forth steps of another process, in accordance with aspects of the present disclosure.

Turning now to FIG. 3, an example flowchart setting forth steps of a process 300, in accordance with aspects of the present disclosure, is shown. The process 300 may be carried out using various systems, devices, or hardware, such as system 100 described with reference to FIG. 1, to perform a baseline scan using one or more baseline emitting devices at one or more lower operating wavelengths than a first set of wavelengths ranging between 750 nm and 1050 nm. The baseline scan may help generate the baseline imaging data described earlier. In some embodiments, the system 100 may use a second set of wavelengths varying between 1050 nm and 1700 nm to more accurately image and/or identify deep tissue injuries (e.g., damaged capillaries, blood vessels, and muscles). The imaging data associated with the first set and the second set of wavelengths may be combined in various mathematical combinations to generate more accurate three-dimensional injury maps.

At 301, the system may configure the baseline emitting device based on preprogrammed settings. In some embodiments, the system may modify these settings based on one or more user inputs as described at steps 202 and/or 203 of FIG. 2. At 302, the system may turn On the baseline emitting device (e.g., LED or laser operating at a shorter wavelength than the imaging wavelength). At 303, the system may acquire baseline imaging data based on scanning the area under detection in a reflectance mode of operation. In some embodiments, the system may be configured to acquire data in a transmittance mode of operation depending upon the thickness of the tissue to be imaged and its correlation with the penetration depth of the baseline imaging wavelength.

At 304, the system may correlate the data obtained by the baseline scan with data acquired by machine learning models to subtract out the contribution from blood-flow in veins. The comparison between the baseline scan and the higher wavelength infrared scan can help determine which regions are associated with the presence of blood vessels such as veins due to data associated with determining the presence of rapid blood flow. In some instances, the changes in blood flow may be discernible depending upon the heart rate and regions with such changes can be subtracted out because these regions stand in contrast to those that have coagulated blood. Non-invasive, optical methods for detecting heart rate and blood flow are well-known in the community.

At 305, the system will provide the baseline results from step 304 to the processing system for refining the final output data, as described in steps 207 and 208 of FIG. 2 described earlier. In some embodiments, the system may provide personalized recommendations based on analyzing the final output data and user information to estimate a healing time, and/or provide further information about help centers that users suffering extensive tissue injury due to abuse or assault may contact. In some embodiments, the system may record imaging date and time stamps, location stamps, and other relevant information that can aid in the authentication of the injury data for later submission in legal proceedings. For example, the system may record information about the facility, personnel, time, date, and/or user demographic data at the time of imaging and/or image analysis for the injured victim.

Figure 4A:
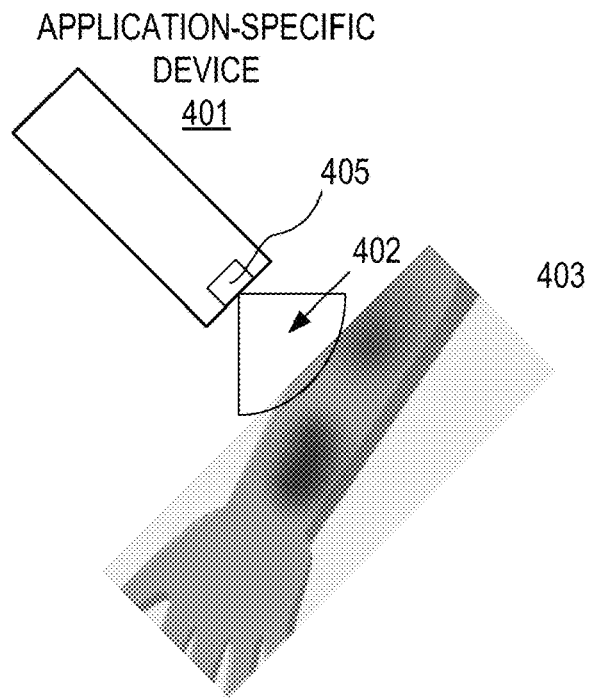
FIG. 4A shows an illustration of an application of the system in FIG. 1, in accordance with aspects of the present disclosure.
Figure 4B:
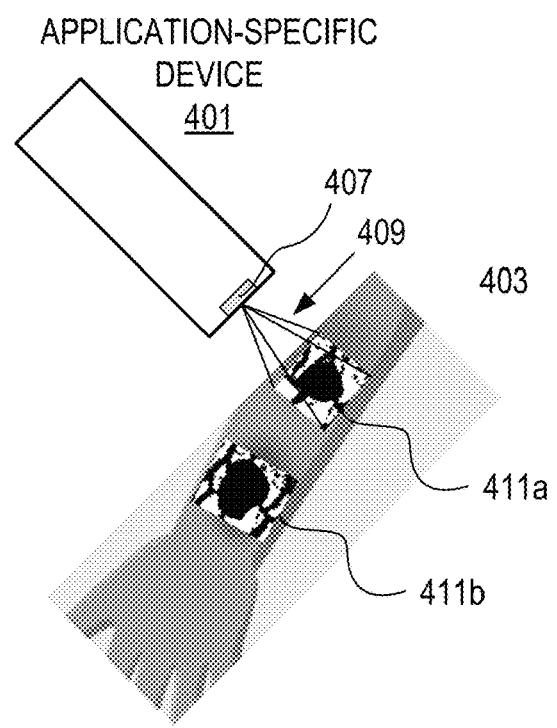
FIG. 4B shows another illustration of an application of the system in FIG. 1, in accordance with aspects of the present disclosure.

FIGS. 4A-4B show illustrations of applications of the system 100 described with reference to FIG. 1. Specifically referring to FIG. 4A, the system 100 may include an application-specific device 401 that may be configured to generate and emit infrared or near-infrared light 402 to illuminate an area under detection on a subject 403 (e.g. arm with bruises). The light 402 may be emitted by one or more light emitting device(s) or light emitting component 405, as shown in FIG. 4A, and in some cases, scanned across the area under detection on the subject 103.

As described, bruises that occur due to subcutaneous blood coagulation may not be visible by the naked eye either due to the skin tone, the depth at which the blood vessel damage occurred, obesity, and/or thickness of skin. In cases of strangulation, the physiology of the neck region hinders the formation of visible signs of strangulation making strangulation a form of physical abuse that remains hidden in a large percentage of cases. Signs of strangulation instead surface as red eyes or petechiae, burst capillaries in the face (e.g., around the eyes, cheeks,) and swollen lips. Deep tissue imaging using the embodiments described herein can train machine learning models to uniquely and accurately identify, capture, and estimate strangulation based injuries and/or severity.

The systems and methods described herein are capable of circumventing the above noted hurdles of imaging deep tissue injuries, strangulation injuries, and other difficult to identify injuries stemming from physical abuse, by providing consistent results irrespective of skin color, obesity, thickness of skin, and at depths that can be up to ten times greater than those perceivable by the naked eye under visible light conditions. To this end, the application-specific device 401 may be configured to detect light signals (e.g. reflected light, transmitted light, etc), and analyze the signals to determine injury. As described, in some implementations, an injury map (e.g. a three-dimensional injury map) may be generated by processing/analyzing data associated with the detected light signals.

In some implementations, as shown in FIG. 4B, the application-specific device 401 may include a projection component 407 that is configured to generate and project rays 409 on the subject 403. The projected rays 409 may include light having visible wavelengths (e.g., red and green) to provide a contrast to the yellowish skin tone of the general population. However, wavelengths of the projected rays 409 may be of another color, depending upon the skin color of the area under detection. As shown in FIG. 4B, the projected rays 409 may form images 411*a-b* that are visible on the skin of the subject 403. In some implementations, the images 411*a-b* may indicate regions of blood coagulation. The images 411*a-b* may also indicate underlying veins because veins also contain deoxygenated blood.

Figure 5A:
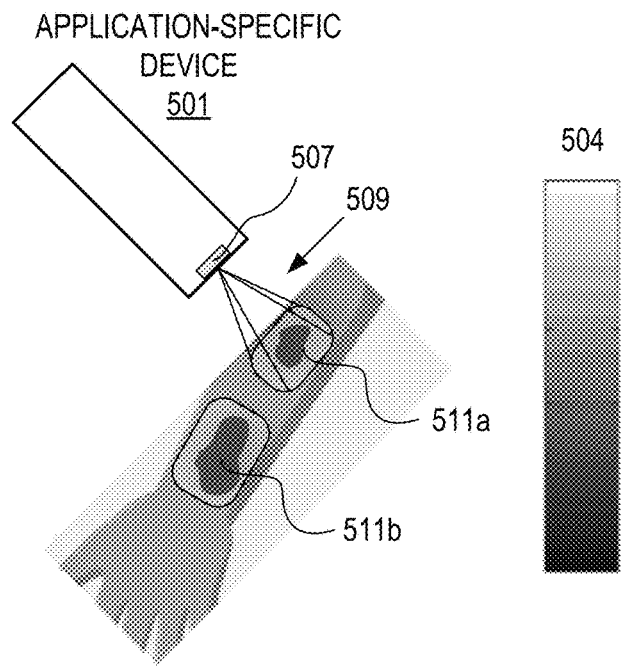
FIG. 5A shows yet another illustration of an application of the system in FIG. 1, in accordance with aspects of the present disclosure.
Figure 5B:
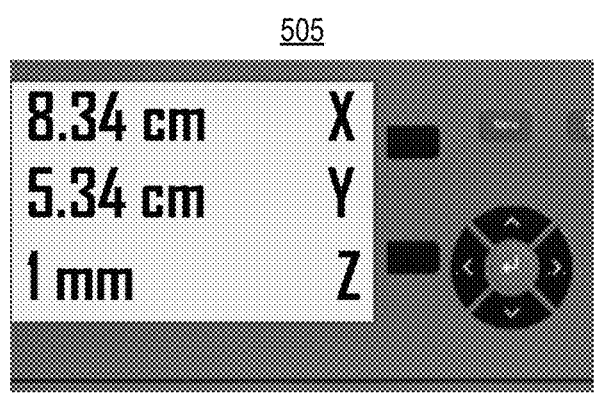
FIG. 5B shows an illustration of an example display, in accordance with aspects of the present disclosure.

FIGS. 5A-5B show illustrations of applications of the system 100 described with reference to FIG. 1. As shown in FIG. 5A, the system 100 may include an application-specific device 501 that includes a projection component 507 that is configured to generate and project rays 509 on a subject. The projected rays 509 may form images 511*a-b* on the skin of the subject. The images 511*a-b* may indicate outlines and/or regions of subcutaneous coagulated blood and/or tissue injury without the presence of confounding underlying vascular networks. These regions may be determined as described in steps 207-208 of FIG. 2 and steps 304-305 of FIG. 3 described earlier.

In some embodiments, the system may generate an output projected image with varying intensity levels that may correspond to the depth at which the coagulated blood and/or tissue injury is present. This may be represented by a grayscale bar 504 that may accompany a digital readout device and/or display screen. In some embodiments, the system may include a digital readout screen 505 that can provide an estimated size of the region containing coagulated blood. The "Z" may represent an estimated depth of the injury. The system may display subject information and various other operational parameters including wavelengths used to perform the imaging, respective power levels of the light emitters, wavelength range of imaging, location, and date and time of day.

In some embodiments, the system may analyze the user information associated with genetic ethnicity, location, age, weight, cause of injury, date and/or time of injury to refine the machine learning models and improve the accuracy of determining subcutaneous areas with blood coagulation and/or blood vessel breakages. This may translate into improved accuracies in estimating the depth of the injury and the size of the injury. For example, changes in absorption of the imaging wavelengths may be correlated with determining the healing stage that the injury is in. For example, recent blood vessel injuries that result in pooling and coagulation of blood may have a greater presence of fresh blood still leaking into that region resulting in a difference in absorption for the imaging electromagnetic waves. This will cause increased reflectance that can be translated into determining that the injury is the Stage 1 of healing. As another example, a blood vessel injury that has occurred a few days ago will primarily contain deoxygenated and coagulated blood that may cause increased absorption, and thus, decreased reflectance of the imaging electromagnetic waves. These reflectance intensities can be used to determine that the injury is in Stage 2 of healing. In this manner, spectroscopic data collected from imaging blood vessel injuries in different stages of healing can be used to predict stages of healing for future imaging purposes of blood vessel injuries. This information can be particularly useful in determining an approximate date and/or time of injury and correlating that with descriptive narratives provided by victims of assault and lending a voice to disabled persons, babies, and injured animals who cannot vocalize the date and/or time of assaults or other incidents that might have caused such injuries.

In some embodiments, a first scan may be performed at a wavelength that coincides with high absorption regions of oxygenated hemoglobin (e.g., between 700 nm and 800 nm). A second scan may be performed that coincides with the high absorption regions of deoxygenated hemoglobin (e.g., between 850 nm and 1100 nm). By comparing the reflectance data of the two scans, the system may determine regions of subcutaneous blood coagulation and/or leakage more accurately. In some embodiments, each scan at a respective center wavelength may be weighted at pre-determined levels to enhance the detection of deoxygenated blood and/or bilirubin concentrations in the blood. The ratio of the weighted scans can be used to determine the stages of healing and/or extent of tissue inflammation associated with the subcutaneous blood coagulation and soft tissue injury.

In some embodiments, the imaging may be performed to identify and analyze indicators of strangulation. An attack that relies on strangulation of a victim is serious. The consequences of being a victim of strangulation are brain damage, pneumonitis, miscarriage, heart attacks, and delayed deaths. In many observed cases of strangulation, no injuries are visible to the naked eye. Victims of strangulation fail to realize the seriousness of the injuries suffered. Medical, law enforcement, and legal personnel fail to perceive the level of physical injury that the victim has suffered, many times adversely affecting the victim's credibility and ability to seek appropriate medical, legal, and judicial assistance.

By acquiring deep tissue images of strangulation, the system described herein can image, analyze, and identify specific signatures that uniquely correspond to strangulation injuries. The system may acquire images of the neck, face, eyes, ears, and scalp to identify signatures that uniquely result from strangulation injuries such as subcutaneous blood pooling in unexpected regions of the face, burst capillaries from extreme and inflicted pressure variations, and muscle damage. By comparing the acquired three-dimensional images with a custom-built database of images that are hallmarks of strangulation injuries, the system may generate a unique set of identifiers that comprise a signature for identifying, analyzing, and assessing extent and/or severity of strangulation injury. The system may then provide one or metrics that are indicative of the extent, severity, approximate date, and causation of the strangulation injury to the user. The extent and severity of the strangulation injury may include a number of locations that sustained direct or indirect physical trauma, and a depth dependent, a frequency dependent, and spatial map of the physical trauma regions. The causation of the strangulation may be identified based on unique physical trauma signatures associated with strangulation by a rope, electrical cord, hands, or other instrument. As described earlier, an approximate date of injury may be estimated based on analyzing the extent and severity of the strangulation injuries with the stages of deep tissue injury healing. This may include correlating the acquired imaging data (e.g., reflectance data, back-scattered data) with imaging data associated with the different stages of healing from strangulation injuries.

In some embodiments, the system may be configured to provide personalized user recommendations for seeking medical evaluation of the injury based on the estimated date of injury, severity of injury, estimated probability of adverse health events (e.g., brain damage, miscarriage, heart attack, etc.), and an assessment of an on-going threat level. The on-going threat level may be ascertained based on user input comprising duration of physical assault, number of physical assaults experienced over a specific duration of time (e.g., one week, one month, one year, ten years, etc.), personality and/or character traits of the abuser, determining estimated probability of recidivism of the abuser, socioeconomic conditions of the abuser and/or user, among other factors known to influence often turbulent and power driven dynamics between an abuser and the corresponding victim.

While illustrative systems and methods as described herein embodying various aspects of the present disclosure are shown, it will be understood by those skilled in the art, that the invention is not limited to these embodiments.

For example, although embodiments described herein are largely directed towards multispectral optical probing, imaging, and/or scanning methods and systems, in other embodiments, photoacoustic imaging techniques may be used in combination with optical imaging or in a standalone configuration. Photoacoustic imaging combines optical imaging methods and systems, including some of those described above, with ultrasound measurements with the goal of improving the resolution of the acquired tissue, vascular information, and/or tissue injury. The results from photoacoustic imaging systems may include targeted information about injury-specific chromophores associated with oxygenated and deoxygenated hemoglobin, collagen, lipids, water, and/or melanin. Improvements in solid state laser technology (e.g., nanosecond Q-switched lasers) are opening up avenues for fast, low intensity, safe, optical laser scanning across the visible, near-infrared, and infrared spectra. Depth penetration may be achieved up to a few millimeters under the surface of human skin providing three-dimensional injury maps that can be used as evidence of physical assaults.

Embodiments herein relate to methods and systems that provide for enhanced perceptions of subcutaneous blood coagulation from broken capillaries and/or damaged blood vessels following impact injuries in a noninvasive, rapid, safe, and accurate manner. Methods and systems described herein utilize near-infrared and infrared wavelengths of the electromagnetic spectrum to probe subcutaneous deeper tissue layers in a safe manner. The reflected and/or back-scattered portions of those wavelengths can be detected with on-chip or off-chip photodetectors, infrared cameras, and/or connected computational circuitry capable of translating, processing, analyzing, and/or mapping the interactions of those photons with the imaged tissue including skin, underlying tissue, and the vascular network. Detector outputs can be processed by software that will translate the captured electromagnetic data into displayed data (e.g., three-dimensional or two-dimensional spatial or temporal injury maps) that can be used to determine the existence, extent, depth, position, and/or type of tissue injury. The injury maps may be analyzed and/or displayed based on the corresponding imaging frequency to generate frequency dependent or wavelength dependent spatial and/or temporal injury profiles. The results from this analysis can be used to determine injury causation including an approximate time window for the injury sustained, predictions of the time need for the injuries to heal, better treatments, more timely treatment interventions, and/or guide future engagement in physical activities of the injured person or animal.

The methods and systems described herein may incorporate machine learning models that have been trained to map out and/or identify veins, arteries, and other circulatory blood networks that may provide false positives for subcutaneous blood pooling and/or coagulation. The data from these trained machine learning and/or artificial intelligence models can be used to increase the accuracy of detecting blood vessel breakages, subcutaneous blood coagulation, and the associated tissue injuries by subtracting out unwanted false positive contributions from the blood circulatory networks. While primary imaging of deeper tissue and blood vessel networks may be accomplished by using near-infrared and infrared emitters, detectors, and cameras, projections of the final user output and/or baseline images may be performed by using other visible wavelength emitters (e.g., visible light LEDs) that can be perceived by the naked eye. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present invention.

The invention claimed is:

1. A method comprising:
generating, by an application-specific device, light comprising a first set of wavelengths;
imaging, by the application-specific device and using the first set of wavelengths, a user selected imaging area of a subject;
receiving, by the application-specific device, optical data associated with the imaging area on the subject and the first set of wavelengths;
determining, by the application-specific device and based on the optical data, at least one three-dimensional area of subcutaneous blood coagulation in the imaging area;

accessing, by the application-specific device and based on the imaging area, one or more regions of baseline data, wherein the one or more regions of baseline data is associated with undamaged circulatory networks;

generating, by the application-specific device, a three-dimensional injury map based on subtracting the one or more regions of baseline data from the at least one three-dimensional area of subcutaneous blood coagulation; and projecting, by the application-specific device and based on the three-dimensional injury map, an image outlining an extent of tissue injury onto the subject.

2. The method of claim 1, wherein the projecting the image outlining the extent of the tissue injury further comprises:

projecting a two-dimensional image of the at least one region associated with subcutaneous blood coagulation based on a shorter wavelength than the first set of wavelengths used for scanning the imaging area of the subject.

3. The method of claim 2, wherein the two-dimensional image associated with subcutaneous blood coagulation is projected on a corresponding anatomical portion of the subject that comprised a part of user selected imaging area.

4. The method of claim 2, wherein the shorter wavelength is associated with the visible portion of the electromagnetic spectrum.

5. The method of claim 2, wherein the first set of wavelengths used for scanning the imaging area are associated with near-infrared wavelengths.

6. The method of claim 5, wherein the first set of wavelengths used for scanning the imaging area can vary from approximately 750 nm to 1080 nm.

7. The method of claim 1, wherein the generating the light comprising the first set of wavelengths comprises:

controlling, by the application-specific device, at least two light emitting devices that respectively generate light corresponding to two different center frequencies of emission between 750 nm and 1080 nm.

8. The method of claim 1, further comprising:

receiving, by the application-specific device, user information associated with cause of injury;

determining, by the application-specific device, an estimated date of injury based on the at least one region associated with subcutaneous blood coagulation and the information associated with cause of injury; and displaying the estimated date of injury.

9. The method of claim 8, further comprising:

causing, by the application-specific device, display of the three-dimensional injury map on a screen.

10. A system comprising:

at least one light emitting component configured to illuminate, using a first set of wavelengths, a user selected imaging area on a subject;

one or more photodetectors configured to receive optical data associated with the imaging area on the subject and the first set of wavelengths;

an analysis system configured to:

receive, from the one or more photodetectors, optical imaging data;

analyze the received optical imaging data to determine at least one three-dimensional area of subcutaneous blood coagulation;

access, based on the imaging area, one or more regions of baseline data, wherein the one or more regions of baseline data is associated with undamaged circulatory networks; and generate a three-dimensional deep injury map based on subtracting the one or more regions of baseline data from the at least one three-dimensional area of subcutaneous blood coagulation; and a projection system configured to:

receive, from the analysis system, the three-dimensional injury map; and project, using visible optical light, an image outlining an extent of tissue injury on the subject, wherein the image outline is based on the three-dimensional deep injury map.

11. The system of claim 10, wherein the image outlining the extent of tissue injury is a two-dimensional image associated with subcutaneous blood coagulation.

12. The system of claim 10, the projection system further configured to project the image outline on a corresponding anatomical portion of the subject that comprised a part of user selected imaging area.

13. The system of claim 10, wherein the projecting the image outlining the extent of tissue injury is based on a shorter wavelength than the first set of wavelengths.

14. The system of claim 10, wherein the first set of wavelengths can vary from approximately 750 nm to 1080 nm.

15. The system of claim 10, the analysis system further configured to:

receive user information associated with cause of injury;

determine an estimated date of injury based on the at least one region associated with subcutaneous blood coagulation and the information associated with cause of injury; and send the estimated date of injury information to a display.

16. A non-transitory computer-readable storage medium storing instructions that, when executed by one or more processors, cause the one or more processors to:

illuminate, by at least one light emitting component and using a first set of wavelengths, a user selected imaging area on a subject;

receive, by one or more photodetectors configured to receive optical data associated with the imaging area on the subject, the first set of wavelengths;

receive, from the one or more photodetectors, optical imaging data;

analyze the received optical imaging data to determine at least one three-dimensional area of subcutaneous blood coagulation;

access, based on the imaging area, one or more regions of baseline data, wherein the one or more regions of baseline data is associated with undamaged circulatory networks;

generate a three-dimensional deep injury map based on subtracting the one or more regions of baseline data from the at least one three-dimensional area of subcutaneous blood coagulation;

receive, from the analysis system, the three-dimensional injury map; and project, using visible optical light, an image outlining an extent of tissue injury on the subject, wherein the image outline is based on the three-dimensional deep injury map.

17. The non-transitory computer-readable storage medium of claim 16, wherein the image outlining the extent of tissue injury is a two-dimensional image associated with subcutaneous blood coagulation.

18. The non-transitory computer-readable storage medium of claim 16, wherein the one or more processors project the image outline on a corresponding anatomical portion of the subject that comprised a part of user selected imaging area.

19. The non-transitory computer-readable storage medium of claim 16, wherein the image outlining the extent of tissue injury is based on a shorter wavelength than the first set of wavelengths.

20. The non-transitory computer-readable storage medium of claim 16, wherein the one or more processors:
   receive user information associated with cause of injury;
   determine an estimated date of injury based on the at least one region associated with subcutaneous blood coagulation and the information associated with cause of injury; and
   send the estimated date of injury information to a display.

* * * * *